June 19, 1962  C. S. GLENNY  3,039,663
DUAL CARRIER BASKETS FOR BICYCLES
Filed March 30, 1959
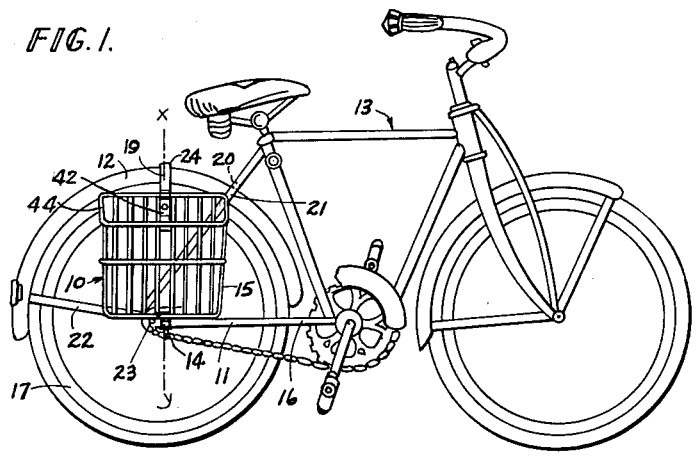
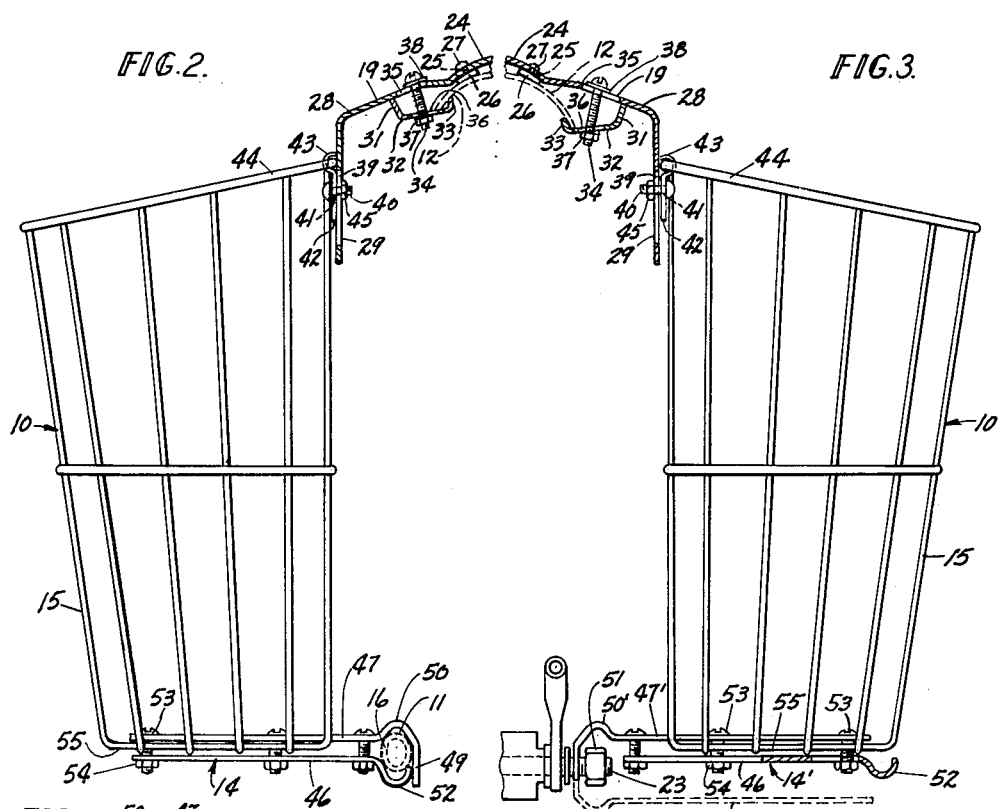
INVENTOR
CLARENCE S. GLENNY
ATTORNEY United States Patent Office 3,039,663
Patented June 19, 1962

3,039,663
DUAL CARRIER BASKETS FOR BICYCLES
Clarence S. Glenny, Rockford, Ill., assignor to The Washburn Company, Worcester, Mass., a corporation of Massachusetts
Filed Mar. 30, 1959, Ser. No. 802,846
5 Claims. (Cl. 224—32)

This invention relates to new and improved dual carrier baskets for application to the opposite sides of the rear portions of bicycles, the present ones relying for their support partly upon attachment to the rear fender and partly upon attachment either to the frame or rear axle, the construction herein disclosed being in the nature of an improvement upon that disclosed in my copending application, Serial No. 594,902, filed June 29, 1956, which resulted on June 16, 1959, in Patent No. 2,890,819.

The novel attaching means provided in accordance with my invention have been designed with a view to:

(1) Ease of assembly on a bicycle so that a person having little mechanical ability will not find it too difficult to apply the baskets to a bicycle satisfactorily;

(2) Adjustability and adaptability of the attachments to suit different makes and models of bicycles, the present attachments enabling mounting the baskets spaced outwardly from both sides of the frame far enough to leave ample operating clearance between the frame and baskets for projecting items of equipment provided on certain bicycles;

(3) Reasonably quick and easy detachability of the baskets from the bicycle without sacrificing rigidity and security of connection when attached, it being recognized that some youngsters, who need these baskets for carrying newspapers, prefer to have the baskets on the bicycle only while they are being used for that purpose, and (4) Minimum damage to the finish on the bicycle in the fastening of the attachments to the frame and fender.

The salient feature of the present construction is the provision of attaching brackets at the bottom of the assembly under the baskets for connection with the opposite sides of the frame or opposite ends of the rear axle interchangeably, each bracket consisting of a pair of elongated plates for abutment with the inner and outer sides of the wire bottom wall of the associated basket and having generally C-shaped jaw portions on the ends thereof which when disposed in opposed relation are adapted to receive therebetween the lower rear fork portion of a bicycle frame, where the baskets are to be attached in that way, one of said C-shaped jaw portions, however, having a perforated extension which in the event the baskets are to be attached to the rear axle can be assembled on the axle instead, with the extension projecting downwardly from above or upwardly from below, whichever is preferred, the C-shaped jaw portion on the other plate in that event being disposed at the outer end of the assembly, out of the way.

The invention is illustrated in the accompanying drawing, in which—

FIG. 1 is a side view of a bicycle equipped with dual carrier baskets made in accordance with my invention;

FIG. 2 is a rear view of the left hand basket and the attaching means shown applied to the rear fender and rear fork on a bicycle, which appear in dotted lines;

FIG. 3 is a rear view of the right hand basket and attaching means shown applied to the rear fender and rear axle on a bicycle, the rear fender being indicated in dotted lines, and an alternative position for the upper one of the pair of elongated plates that attaches to the rear axle being also indicated in dotted lines, and FIGS. 4 and 5 are perspective views of the C-shaped jaw portion on the upper plate showing how the axle attaching extension may be slotted, as in FIG. 4, or merely have an axle receiving hole provided therein, as in FIG. 5.

Similar reference numerals are applied to corresponding parts throughout the views.

Referring to the drawings, the reference numeral 10 designates the dual carrier baskets of my invention generally, shown applied to the rear portion of the frame 11 and rear fender 12 of a bicycle indicated generally by the reference numeral 13. Two frame-attaching brackets 14 or 14' are provided at the bottom of the assembly under the baskets 15 at the middle thereof for connection with the opposite sides of the lower rear fork portion 16 of the frame for support of the baskets in rigid relationship to the bicycle frame and parallel to the rear wheel 17 and spaced outwardly from both sides of the bicycle to the same appreciable extent, as best appears in FIGS. 2 and 3, giving good balance for easier riding of the bicycle, and also providing ample clearance for any projecting equipment on the bicycle, such as the wheel-driven generator (not shown). The fender-attaching bracket 19, which is of generally inverted U-shape and straddles and has connection with the middle portion of the rear fender 12, serves by connection with the upper ends of the baskets 15 at the middle of their inner sides, to further support the baskets in rigid relationship to the bicycle frame, due to the fact that the point of connection of the bracket 19 with the fender 12 is so close to the point where the fender 12 is fastened to the cross-portion 20 of the upright rear fork portion 21 of the bicycle frame. The rear end of the fender 12 is, of course, also supported against sidewise displacement by means of the usual fork 22 that connects to the rear axle 23. The fender-attaching bracket 19, as best appears in FIG. 1, is disposed approximately in the same vertical plane $x$—$y$ with the frame-attaching brackets 14 or 14' mentioned previously, this plane passing through the middle portion of the two baskets 15, so that the load of newspapers placed in each basket is distributed symmetrically with respect to brackets 14 or 14' and 19 supporting that basket and the basket, therefore, is not so apt to get bent out of shape. The loads in the two baskets are usually kept fairly evenly balanced to enable easier riding and steering, and so long as neither basket is too greatly overloaded in relation to the companion basket, it should be evident that the side pull on the rear fender 12 will be fairly balanced and there will be no danger of the fender getting bent out of shape.

The fender-attaching bracket 19 has the middle portion 24 of the cross-portion of the U arched upwardly to conform to the arcuate cross-section of the fender 12, and there are holes 25 in the opposite ends of this arcuate portion 24 in which the reduced supporting shanks of rubber bumper pads 26 are received, these pads 26 having engagement with the fender 12 on the opposite sides of the crown portion thereof, as best illustrated in FIGS. 2 and 3, for support of the bracket 19 on the fender without any metal to metal contact with the fender externally thereof, so that the finish on the fender will be protected. Slightly enlarged semi-spherical heads 27 are provided on the outer ends of the shanks of the pads 26 which can be compressed and forced through the holes 25 to prevent accidental displacement of the pads from the holes 25 while the assembly is not applied to the fender. The bracket 19 has the opposite end portions 28 of the cross-portion of the U elongated to the extent shown in FIGS. 2 and 3, so as to locate the downwardly projecting, substantially vertical, basket-attaching arms 29 far enough away from both sides of the fender 12 for ample clearance with respect to any projecting equipment on either side of the bicycle, like the generator mentioned previously and any other items of equipment, such as the change-speed, flexible control cable running to one end of the rear axle. These outwardly reaching opposite end portions 28 also provide surfaces on their underside, as appears in FIGS. 2 and 3 for clamping abutment of the one upwardly reaching end 31 of the U-shaped sheet metal clips 32 provided for clamping the bracket 19 onto the fender 12 at the opposite side portions of the latter, the clips 32 having upwardly reaching inner end portions 33 for abutment with the underside of the fender, and the clips being arranged to be drawn upwardly into tight clamping engagement with the fender by means of bolts 34. These extend through slots 35 in the bracket 19 and through slots 36 in the cross-portion of the clips 32 and have nuts 37 threaded on their projecting lower end portions to permit tightening the clips 32 on the fender to the extent necessary to hold the fender-attaching bracket 19 in rigid relationship to the fender. Obviously, narrower fenders 12 will necessitate having the clips 32 adjusted closer together, while wider fenders will necessitate adjusting the clips 32 farther apart, and that is the reason for providing the slots 35 lengthwise of portions 28. The slots 36 in clips 32 extending lengthwise of the cross-portion thereof enable adusting the individual clips in or out with respect to the lower end portions of bolts 34 so that they both overlap about the same width of the underside of the fender. Lock-washers are preferably provided under the heads of the bolts 34, as indicated at 38 in FIGS. 2 and 3, to reduce likelihood of the bolts loosening after they have been properly tightened. The arms 29 have vertically extending slots 39 provided therein for adustable reception of bolts 40 that are entered through holes 41 provided in brackets 42 that are disposed vertically alongside the arms 29 and are clamped by means of hook-shaped upper end portions 43 to the inner side-portions of the rectangular wire top frames 44 on the baskets 15. Nuts 45 are threaded on the projecting inner end portions of the bolts 40 and the bolts are arranged to be tightened to clamp the brackets 42 to the arms 29 in adjusted relationship thereto. Thus, if the rider finds that the baskets 15 are too far forward when set at the mid-location x—y shown in FIG. 1 and there is not enough foot room with respect to the lower front portions of the baskets for comfortable pedalling, he can set the brackets 14 or 14' and 42 farther forward on the baskets and thus dispose the baskets that much farther to the rear on the bicycle, assuming no change is made in the location of brackets 14 and 19 on the bicycle. It is generally not necessary to set the brackets 14 or 14' and 42 too far forward from the middle vertical plane x—y of the baskets to give rise to any danger of the baskets getting bent out of shape due to the uneven distribution of weight in the baskets relative to the vertical plane of the brackets.

The two frame-attaching brackets may be of the form shown at 14 in FIG. 2, or of the closely similar form shown at 14' in FIG. 3. In brackets 14, the lower plate 46 is identical with lower plate 46 of brackets 14', but the upper plates 47 of brackets 14 are slightly different from the upper plates 47' of brackets 14', the difference being best shown in FIGS. 4 and 5 where there is a vertical slot 48 in the vertical extension 49 on the C-shaped jaw portion 50 on plate 47, in contrast to the hole 48' provided in the vertical extension 49' on the C-shaped jaw portion 50' on plate 47'. There is one advantage in having the slot 48, from the standpoint that it is not necessary to remove the nut 51 from the end of the axle 23 in order to attach the end of the plate 47 to the axle, when the brackets 14 are attached to the rear axle 23, instead of the rear fork 16, as shown in FIG. 2. On the other hand, the other construction shown in FIG. 5 with the hole 48' in the end of plate 47' has the advantage that when the axle 23 is inserted through the hole 48', it is immaterial whether the plate 47' is above the axle, as seen in full lines in FIG. 3, or below it as seen in dotted lines in FIG. 3. In other words, the plate 47' can be inverted and will work equally well either way, but the plate 47 if inverted might slip off the axle if the nut 51 loosened. With both constructions, the lower plate 46 is disposed with its C-shaped jaw portion 52 in opposed relation to the jaw portion 50 or 50' of the upper plate when applied to the rear fork 16 as shown in FIG. 2, but the lower plate 46 is reversed, end to end, when the upper plate 47 or 47' is attached to the rear axle 23, as shown in FIG. 3. Bolts 53 are entered through registering slots that extend lengthwise of the upper and lower plates, and nuts 54 are threaded on the projecting lower end portions of these bolts and are tightened to clamp the plates in abutment with the inner and outer sides of the wire bottom wall 55 of the basket 15 to clamp the plates in adjusted relationship to the bottom of the basket. The bolts 53 are preferably left loose until the plates have been properly located with their opposed C-shaped jaw portions in abutment with the top and bottom of the rear fork 16, as shown in FIG. 2, and the plates have been adjusted properly in a fore and aft direction relative to the bottom of the basket and also adusted endwise, laterally with respect to the bottom of the basket, to provide the desired spacing of the basket with respect to the bicycle frame. In a similar way, when the upper plates 47 or 47' are attached to the rear axle 23, as in FIG. 3, the bolts 48 are left loose until the baskets have been adjusted properly with respect to the plates, both in a fore and aft direction with respect to the bicycle and laterally with respect to the bicycle frame to provide the desired spacing with respect thereto. With the bolts 53 tightened there is assured not only secure clamping of the brackets onto the bottom of the baskets, with either mounting, but also secure clamping of the brackets on the bicycle frame, with the mounting shown in FIG. 2. The C-shape of the jaws 50, 50' and 52, I have found makes the brackets universally applicable to different makes and models of bicycles.

In operation, the fender-attaching bracket 19 is generally first applied to the fender 12 slightly forwardly with respect to a vertical line through the rear axle 23, assuming the frame-attaching brackets 14 are to be attached to the rear fork 16 as shown in FIG. 2. The load is, therefore, assumed fairly close to the point of connection of the fender 12 at 20 with the upright rear fork portion 21 of the bicycle frame. The frame-attaching brackets 14 are first applied loosely to the bottoms of the baskets 15 to permit freely adjusting the same forwardly or rearwardly relative to the baskets and in or out with respect to the bottom of the baskets to enable getting the baskets properly spaced outwardly with respect to the bicycle. Then the jaws 50 and 52 on the frame-attaching brackets 14 are applied to the opposite sides of the lower rear fork 16, and the brackets 42 are loosely bolted onto the opposite side portions 29 of the fender-attaching bracket 19. Then, when all of the assembled parts are adjusted relative to one another, so that the two baskets 15 are symmetrically arranged, all of the bolts are tightened. Thereafter, if the user decides to remove the baskets 15 after each use or at some particular time where the baskets should be removed, he can do so easily by loosening only the two inner bolts 53 on each frame-attaching bracket 14, enough to allow spreading the jaws 50 and 52 apart far enough to slip off the fork 16, and then if the bolts 40 are removed, or loosened, the baskets can be removed readily, leaving the fender-attaching bracket 19 on the fender. The application of the brackets 14 to the rear axle 23 alters the procedure above described only to the extent that the fender-attaching bracket 19 might be applied a little farther to the rear on the fender 12 if it is to be in the same vertical plane with the frame-attaching brackets 14, but that is not essential. The procedure outlined above is substantially the same when the frame-attaching brackets 14' are used and the C-shaped jaw portions 50' and 52 are used to clamp onto the lower rear fork 16 in the manner shown in FIG. 2 with bracket 14. In both cases, the lower plate 46 is reversed end for end, as shown in FIG. 3, when the upper plate 47 or 47' is applied to the rear axle 23 as shown in FIG. 3. The upper plate 47' of the frame-attaching brackets 14' is applicable in either of the two ways shown in full lines and in dotted lines in FIG. 3, the latter method of application giving the basket a somewhat lower setting on the bicycle, which some riders will prefer.

It is believed the foregoing description conveys a good understanding of the objects and advantages of my invention. The appended claims have been drawn to cover all legitimate modifications and adaptations.

I claim:

1. In a bicycle having a frame including a substantially horizontal rear fork portion, and having a rear wheel mounted in said fork on a rear axle that is secured in place in said fork by means of nuts threaded on the opposite ends of said axle, a carrier basket disposed substantially vertically alongside said fork, and an elongated bracket horizontally disposed and secured to the bottom of said basket transversely thereof and adapted to be secured alternatively at one end to one side of said rear fork for fore and aft adjustment on said frame and rigid support on said fork in a desired spaced relationship to one of the pedals of the bicycle or to one end of said rear axle for similar support, said bracket comprising a pair of elongated horizontal plates disposed in substantially parallel relationship in adjustable abutment with the inner and outer sides of the bottom wall of the basket, and having bolts entered through registering openings in said plates to fasten the same together and to the bottom of said basket disposed for clamping engagement therebetween, each of said plates having a C-shaped jaw portion on one end, which jaw portions when disposed in opposed relationship are adapted to have adjustable clamping abutment on the top and bottom of one side of the rear fork, the jaw portion on one of said plates having a perforated substantially vertical extension on the inner end adapted to receive one end portion of the rear axle therein when the bracket is fastened to the axle by means of the axle nut, said plate being reversible upside down so as to dispose the extension extending upwardly or downwardly relative to the plate and accordingly dispose the basket at different elevations relative to the axle, the other plate being reversable end for end to dispose its C-shaped jaw portion on one end for cooperative relationship to the other C-shaped jaw portion or in remote retracted relationship thereto.

2. A bicycle basket structure as set forth in claim 1 wherein the perforation in said vertical end extension is an open-end slot to facilitate connection with and disconnection from the axle by eliminating necessity for removal of the axle nut.

3. In a bicycle having a frame including a substantially horizontal rear fork portion, and having a rear wheel mounted in said fork on a rear axle that is secured in place in said fork by means of nuts threaded on the opposite ends of said axle, a carrier basket disposed substantially vertically alongside said fork, and an elongated bracket horizontally disposed and secured to the bottom of said basket transversely thereof and adapted to be secured alternatively at one end to one side of said rear fork for fore and aft adjustment on said frame and rigid support on said fork in a desired spaced relationship to one of the pedals of the bicycle or to one end of said rear axle for similar support, said bracket comprising a pair of elongated horizontal plates disposed in substantially parallel relationship in adjustable abutment with the inner and outer sides of the bottom wall of the basket, and having bolts entered through registering openings in said plates to fasten the same together and to the bottom of said basket disposed for clamping engagement therebetween, each of said plates having a C-shaped jaw portion on one end, which jaw portions when disposed in opposed relationship are adapted to have adjustable clamping abutment on the top and bottom of one side of the rear fork, the jaw portion on one of said plates having a perforated substantially vertical extension on the inner end adapted to receive one end portion of the rear axle therein when the bracket is fastened to the axle by means of the axle nut, the bolt receiving openings in at least the other of said plates being elongated lengthwise of said plate to permit adjustability of the plate relative to the bolts entered therethrough, or vice versa, and said plate being reversible end for end when the perforated extension on the first mentioned plate is fastened to the rear axle, whereby to dispose the C-shaped jaw portion of said other plate in an out of the way position remote from the axle.

4. A bicycle basket structure as set forth in claim 1 wherein the bolt receiving openings in both of said plates are elongated lengthwise with respect to said plates to permit endwise adjustment of either of said plates relative to the bolts, or vice versa, laterally with respect to the bottom of the basket.

5. A bicycle basket structure as set forth in claim 3 wherein the perforation in said vertical end extension is an open-end slot to facilitate connection with and disconnection from the axle by eliminating necessity for removal of the axle nut.

References Cited in the file of this patent

UNITED STATES PATENTS

| 1,908,535 | Pawsat | May 9, 1933 |
| 2,890,819 | Glenny | June 16, 1959 |

FOREIGN PATENTS

| 425,531 | Great Britain | Mar. 15, 1935 |
| 56,534 | Norway | May 4, 1936 |
| 43,348 | Netherlands | June 15, 1938 |